Figure 1:
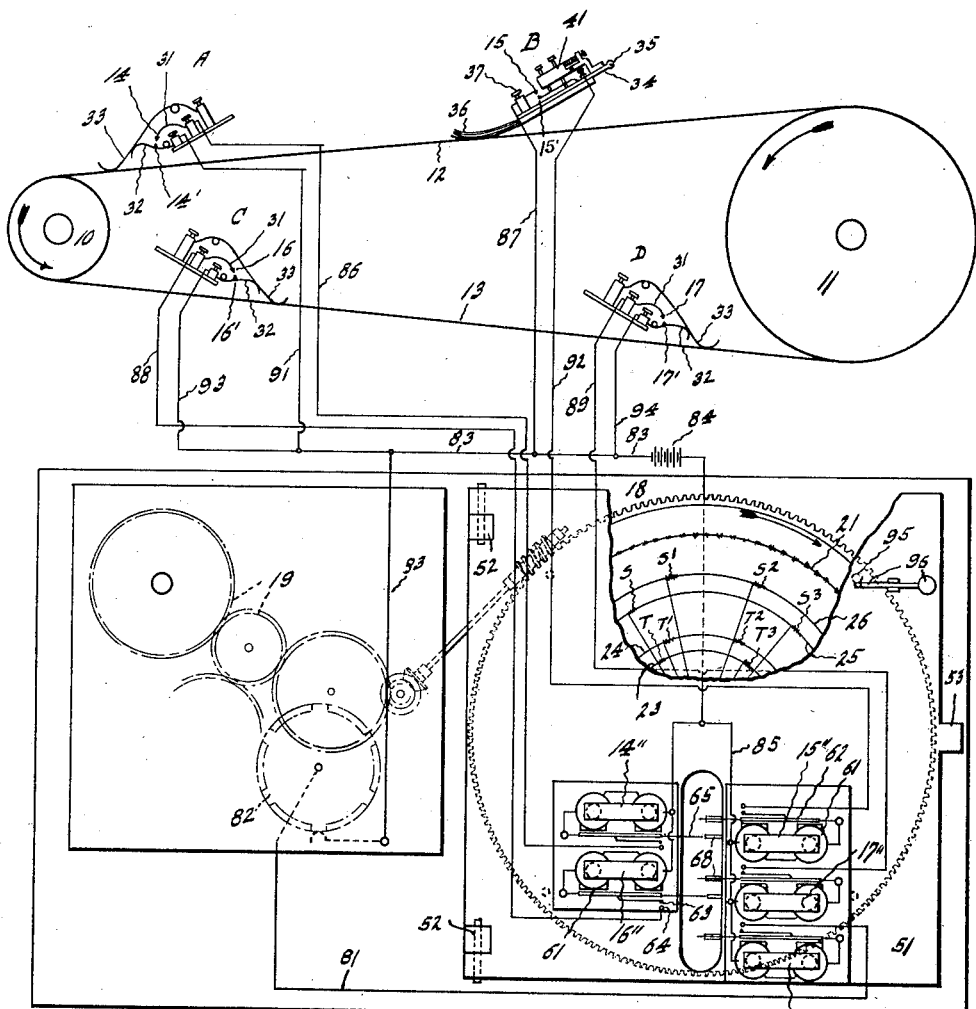

L. N. MORSCHER.
HORSE POWER INDICATOR AND RECORDER.
APPLICATION FILED FEB. 3, 1913. RENEWED DEC. 19, 1913.

1,107,234.

Patented Aug. 11, 1914.

2 SHEETS—SHEET 1.

Witnesses
Frank A. Fahle
Josephine Gasper

Inventor
Lawrence N. Morscher,
By Arthur M. Hood
Attorney

L. N. MORSCHER.
HORSE POWER INDICATOR AND RECORDER.
APPLICATION FILED FEB. 3, 1913. RENEWED DEC. 19, 1913.
1,107,234.
Patented Aug. 11, 1914.
2 SHEETS—SHEET 2.
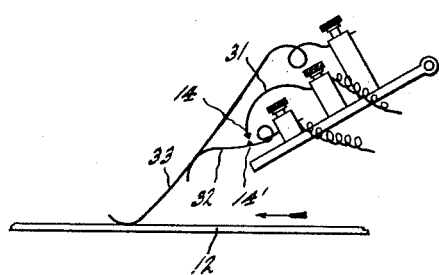
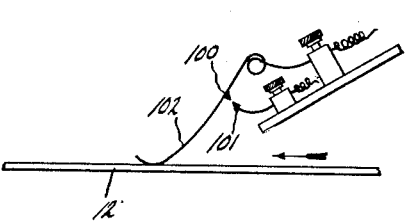
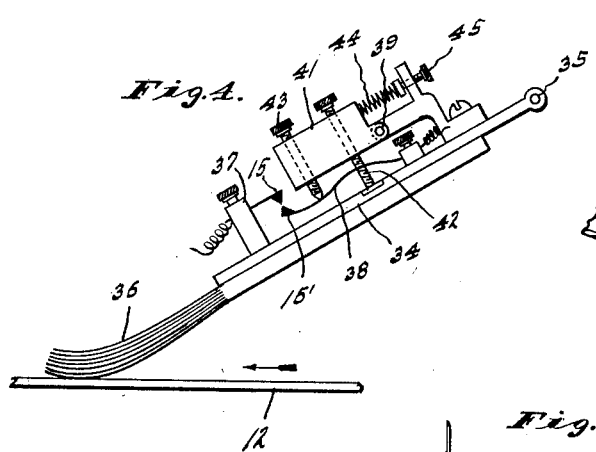
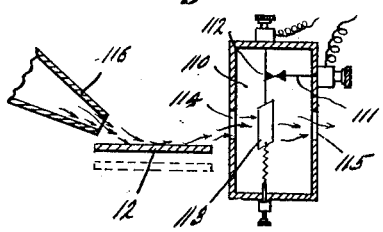
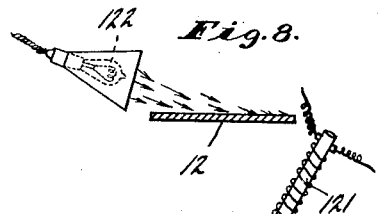
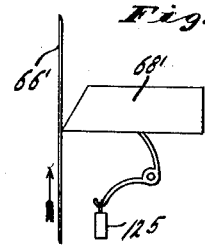
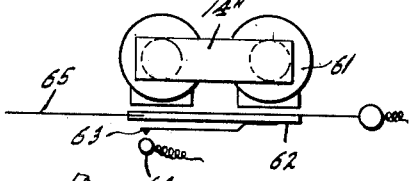
Witnesses
Frank A. Fahle
Josephine Gasper
Inventor
Lawrence N. Morscher,
By Arthur M. Hood
Attorney

UNITED STATES PATENT OFFICE.

LAWRENCE N. MORSCHER, OF LAWRENCE, KANSAS, ASSIGNOR TO HIMSELF AND IRVING HILL, A COPARTNERSHIP.

HORSE-POWER INDICATOR AND RECORDER.

1,107,234.      Specification of Letters Patent.      Patented Aug. 11, 1914.

Application filed February 3, 1913, Serial No. 745,791. Renewed December 19, 1913. Serial No. 807,775.

*To all whom it may concern:*

Be it known that I, LAWRENCE N. MORSCHER, a citizen of the United States, residing at Lawrence, in the county of Douglas and State of Kansas, have invented a new and useful Horse-Power Indicator and Recorder, of which the following is a specification.

I have discovered that the horse-power delivered to any machine and consumed in driving the same can be determined by first determining the tension in the tight and slack sides of the driving belt and then comparing these tensions as modified by certain constants determined by the character of the driving belt and the length thereof. This discovery forms the subject-matter of my pending application Serial No. 690,952.

To best practice the discovery above mentioned, some recording mechanism is desirable, and I have found that some special forms of recording mechanism produce desirable results.

The object of the present application is to disclose and claim specially designed mechanism by which records of the vibrations of the belt (or other transmitting member) may be determined.

As set forth in the above-mentioned application, if a driving force be applied to an object through the medium of a flexible member, such as a belt, and that flexible member be transversely vibrated, the speed of travel of the belt will be not only dependent upon the weight, tension and length of the belt, but, in addition, the speed of vibrations traveling in the direction of transportation of the belt will be greater than the speed of travel of vibrations in the direction opposite to the direction of transportation of the belt by an amount equal to twice the velocity of transportation of the belt. Therefore, if the weight per unit length of the belt be known, its speed of transportation and its tension may be determined by a comparison of the speed of travel of lateral vibrations longitudinally of the belt. The tension of the belt, when reduced to pounds, multiplied by the velocity of transportation of the belt in feet per second, will indicate the power transmitted to the load. It is to be understood that reference to a belt, above, is merely to mention a concrete example of a vibratory force transmitting medium under transportation. The speed of the lateral vibrations in the transmitting member may be determined by means of air jets deflected by the passing lateral vibrations of the belt, the air jets impinging upon small vanes which regulate electrical contacts; or by means of a beam of light cast by a mirror and controlling a selenium cell; or by direct mechanical operation of markers by the vibrating belt, etc., and the apparatus illustrated diagrammatically in the accompanying drawings is therefore presented merely as an illustration.

The accompanying drawings illustrate the apparatus of my present invention.

Figure 2:
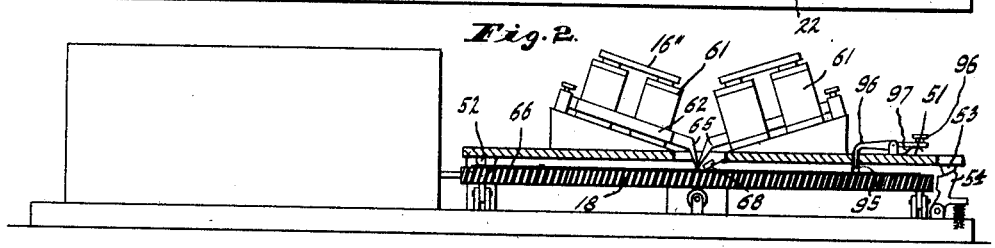

Figure 1 is a plan of the recording mechanism and a diagram of the electrical terminals and connections by means of which the recording mechanism is operated; Fig. 2 is an elevation partially in section, of the recording mechanism shown in Fig. 1; Fig. 3 is an elevation of one form of contact terminal; Fig. 4 an elevation of another form especially designed for eliminating the effect of long swayings or vibrations of the power transmitting belt; Fig. 5 an elevation of another form of contact terminal; Fig. 6 a plan of one of the recording tremblers; Fig. 7 a diagram of another form of contact terminals; Fig. 8 a fragmentary view indicating the use of a selenium cell for controlling the electrical circuits; Fig. 9 a fragmentary perspective of an improved form of mechanism for producing an ink record, and Fig. 10 a fragmentary view of an arrangement for producing an ink line on a vertically moving sheet.

In the drawings, 10 and 11 indicate a driving pulley and driven pulley, respectively, connected by a belt having a tight side 12 and a slack side 13. Arranged adjacent the tight side 12 of the belt at points separated by a known distance are two electrical terminal members A and B and arranged adjacent the slack side of the belt are terminal members C and D. The terminal A is provided with two separable contact points 14 and 14'; terminal member B is similarly provided with two separable contact points 15 and 15'; the terminal member C with separable contact points 16 and 16'; and terminal member D with separable contact points 17 and 17'. The terminal members A, C and D are shown in Fig. 1 as of the same construction, more fully illustrated in Fig. 3. One of the contact points is carried by a comparatively heavy spring arm 31 while the other contact point is carried by a spring arm 32, the two arms being carried by suitable binding posts to which the circuit wires are connected. The free end of the spring arm 32 is engaged by a spring arm 33 which is slightly stronger than the spring of arm 32 and is extended far enough so that its free end may ride lightly upon a belt, the arrangement being such that the ordinary travel of the belt, when it is not under lateral vibration, will permit the arm 33 to hold arm 32 in such position that contact point 14' will be out of contact with the point 14. The corresponding parts, except as to the contact points, are similarly numbered in the terminal members A, C and D of Fig. 1. The terminal member B, shown on a larger scale in Fig. 4, is of different form in order to show a type of terminal member which has been found to be desirable when the apparatus is being used with belts which have considerable lateral sway in vibrations which are comparatively long, as distinguished from the vibrations which are to be artificially set up in the belt for the purpose of determining the tension thereof in a manner to be set out more fully hereafter. In this form of terminal member, the main plate 34 of the structure is supported upon a horizontal pivot 35 at one end and at the other end is supported by a flexible brush-like extension 36 which rides upon the belt. Plate 34 carries a post 37 from which the contact point 15 is projected and the contact point 15' is carried by a spring arm 38 which has a normal tendency upward so as to tend to swing the contact point 15' into engagement with the contact point 15. Arranged above the arm 38 and pivoted upon the horizontal pivot 39 carried by plate 34, is a weight 41, the downward movement of which is limited by a temper screw 42. The weight 41 carries a temper screw 43 which engages the arm 38 and moves it enough to normally hold the point 15' out of engagement with point 15. In order to better control the operation of the structure, the weight 41 is backed up by a spring 44 the force of which may be determined by an adjusting screw 45. In this construction comparatively slow vibrations of the plate 34 about the axis 35 will not produce any vibrations of the weight 41 relative to the plate so that comparatively long lateral vibrations of the belt, due to the various causes which commonly produce swaying in a belt, will not affect the relationship between the contact points 15 and 15', but if the belt is vibrated rapidly in short vibrations the movement of belt 12 will be so sudden that a relative movement of weight 41 will be produced to cause vibration of contact point 15' with relation to the point 15.

Referring again to Fig. 1, the apparatus, which I have provided for recording the operations of the terminal members A, B, C and D, comprises an ordinary motor train 19 which is suitably geared to a record disk 18 so as to rotate the same. Above the record disk I arrange a hinged platform 51 supported upon hinge 52 and provided with a projection 53 arranged to automatically withdraw a brake 54 which otherwise would engage the table 18 and prevent its rotation. Upon plate 51 I mount a plurality of recorders 14'', 15'', 16'' and 17''. I also provide a time recorder 22 of the same construction and each of these recorders is arranged to produce a record upon a record sheet 66 placed upon the disk 18. Many different forms of recorders might be used but I have found by experiment that it is desirable that the recorder be extremely sensitive and I had difficulty in using the common type of electromagnetic recorder in which the vibrating arm carried the marking instrument. If such marking instrument was a pencil the vertical pressure required upon the pencil materially interfered with sensitive operation, and if a pen was carried by the vibrating arm many difficulties of operation were introduced. The ink, if thin enough to flow readily, was apt to spread if the record sheet was stopped; only a comparatively small quantity of ink could be carried without overloading the vibrating arm; sudden vibrations of the vibrating arm were likely to throw the ink from the pen; if a heavy ink was used, it was likely to dry during temporary stoppages of the apparatus and then not properly resume the production of a record upon further movement of the disk, etc. I also found that a recorder which gave but a single response to a closing or breaking of its circuit produced a record which was difficult to read.

In order to overcome the various difficulties above mentioned, as well as some others, I produced the recording apparatus shown more fully in Figs. 6 and 9 wherein each recorder comprises an ordinary electromagnet 61 having a vibrating armature 62 capable of vibration in a plane at right angles to the magnets. This arm 62 carries a contact point 63 which coöperates with a stationary terminal 64 just as in the ordinary electromagnetic bell vibrator, so that the armature 62 will vibrate continuously so long as current is delivered to the circuit of the coil. This armature may be very light and it is provided with an extension 65 provided with a downwardly projecting tip which rests lightly upon the record sheet 66 carried by the table 18. Pivoted to plate 51, upon a horizontal axis 67, is an ink holding shoe or pen 68 so arranged and formed as to be capable of producing a continuous mark 69 upon the record sheet. In practice I have found that the pen 68 may be readily formed by bending a thin sheet into a comparatively acute angle between which a considerable quantity of ink 70 may be held by capillary attraction. The tip of the finger 65 is then arranged either to normally travel in the freshly produced line 69 or just to one side of it so that, whenever the arm 62 is vibrated, the tip of the finger 65 will sweep across or through the fresh ink of the line 69 and produce a wavy record somewhat as indicated at 71 in Fig. 9, this record continuing throughout the time of maintenance of current in the circuit of the vibrating coil. In practice, I find it possible to so adjust the tip of the finger 65 that it does not actually touch the record sheet, the freshly laid ink in the line 69 lying upon, and therefore extending above, the face of the record sheet so that the finger 65 may sweep through it and produce the record referred to. By this arrangement movement of the record finger relative to the record sheet does not induce any additional resistance and therefore the record finger is extremely sensitive to changes of condition of the recording circuit.

The time recorder 22 is connected by wire 81 with a time wheel 82 in an ordinary time train said wheel being provided as usual with make-and-break portions. This wheel is connected by wire 83 with a battery 84 and the battery connected by the common return wire 85 with all of the recorders. Terminals 14, 15, 16 and 17 are connected by wires 86, 87, 88 and 89 respectively with the recorders 14″, 15″, 16″ and 17″, respectively, while the terminals 14′, 15′, 16′ and 17′ are connected by wires 91, 92, 93, and 94, respectively, with the common battery wire 83.

In order to prevent more than one complete rotation of the record disk 18, I provide said disk at one point with a pin 95 which may be engaged by a finger lever 96 carried by plate 51 and normally held in the path of movement of pin 95 by a spring 97.

In operation, supposing the belt, pulleys and record sheet to be in motion in the direction indicated in Fig. 1, continuous record lines 21, 23, 24, 25 and 26 will be produced upon the record sheet by the recorders 22, 14″, 15″, 16″ and 17″, respectively. If the tight and slack sides of the belt be struck with a mallet or otherwise, the tight and slack sides of the belt will be set into lateral vibrations which will travel lengthwise of the belt. The vibrations will cause simultaneous actuation of the terminals 15 and 17′ so as to produce record markings T and S respectively on the record sheet and these markings will be upon the same radial line of the record sheet if the strokes of the mallets are simultaneous and exactly opposite the respective terminals. Whether or not such simultaneous actuation is produced, the records may be brought into proper time relationship by proper comparison with the time record produced by the recording instrument 22 as indicated by the record line 21. The lateral vibrations in the belt will travel toward terminals 14′ and 16′, respectively, and thus cause productions of records T′ and S′, respectively, on the record sheet, the angular space between the records T and T′ being less than the space between the records S and S′ because the speed of vibration in the tight side of the belt will be greater than the speed of vibration in the slack side of the belt, due to the difference in tension, and this difference in tension will be the only cause tending to produce an appreciable difference between the record T—T′ and the record S—S′ because the distances between the pairs of terminals are the same, the weight of the belt per unit length is constant, and the velocity of the belt for the short period required for the vibrations from one pair of terminals to another may be considered as constant even in cases where there is a material fluctuation in belt velocity. If now the tight and slack sides of the belt be struck in such manner that the vibrations will travel from one pair of terminals to the other in the directions opposite to the direction of travel of the belt between the pairs of terminals, a second set of records $T^2$ $T^3$ and $S^2$ $S^3$ will be produced, the distance $T^2$—$T^3$ exceeding the distance T—T′ by an amount equal to twice the velocity of the belt, and the distance S—$S^3$ differing from the distance S—S′ by the same amount. Comparing these readings with the time record 21, the velocity of the belt may be determined and the difference in tension between the tight and the slack sides of the belt may also be determined, whereupon, by multiplying the difference in tension by the velocity of the belt, the transmitted power may be determined. Where the transmission of power is by direct pull through a vibratory medium (in an endless belt) the transmitted horsepower will be determined by multiplying the tension of the member by its velocity of transportation.

By means of the above described apparatus, I find it possible, by mounting the several terminals adjacent the driving belt of any particular machine, to determine, while that machine is under its regular and daily use, the exact amount of power effectively delivered to the machine. It is, therefore, possible after obtaining such a record, to determine whether the particular belt then in use is delivering power efficiently to the machine and to determine whether changes in machine location or driving belt may be economically desirable. It is also possible to determine accurately the power consumption of a machine in different portions of its cycle of operations and thus determine whether, in devices like punches and other intermittently operating machines, the changes in fly wheel design are desirable. There are, of course, many other uses to which the apparatus may be put.

In the form of terminal structure shown in Fig. 5, the contact points 100 and 101 are normally closed, the contact point 100 being carried by a spring arm 102 resting upon the belt. This particular form is not as desirable as some of the other forms because the vibrations of the belt are apt to produce chattering of the contact points before actual separation and before resumption of good contact. The objectionable results of such chattering contact were obviated by the use of the form shown in Figs. 3 and 4.

In the form shown in Fig. 7, I provide a box or chamber 110 within which I mount a fixed contact point 111 and a swinging contact point 112, this last mentioned contact point being provided with a vane 113 which is arranged in the line between an inlet passage 114 and an outlet passage 115. This structure is then arranged alongside of the belt 12 in such way that a blast of air delivered from a spout 116 upon the surface of the belt will be varied in its relationship to the inlet opening 114 by lateral vibration of the belt as indicated in Fig. 7, the arrangement being such that in one lateral position of the belt the air blast will pass into the opening 114 and strike vane 113 so as to swing point 112 into contact with point 111, whereas in the opposite lateral position of the belt the air blast will not enter inlet 114 in such manner as to so affect the vane 113.

In the form shown in Fig. 8 a selenium cell 121 is arranged to be more or less shadowed by lateral vibration of the belt 12 relative to light cast by lamp 122, the variations in current in the circuit of the selenium cell being then utilized to cause operation of recording instruments.

In the form shown in Fig. 10, the record sheet 66' is arranged for vertical movement in which case the marking instrument 68' is arranged substantially horizontally and is held against the record sheet by a weight 125.

Where the belt length and linear velocity is known, it is necessary only to determine the apparent average wave velocity in the belt if suitable tables have previously been prepared giving relative values.

I claim as my invention:

1. In an apparatus for the determination of delivered power, the combination of a vibratory member attached to a load and under linear transportation and stress due to the application of force, and a recording member for recording the speed of travel of lateral vibrations in said vibratory member in the direction of, and in the direction opposite to, the direction of its linear transportation.

2. In an apparatus for the determination of delivered power, the combination with a driving pulley, a driven pulley and an endless transmission belt connecting the same, of means for determining the speed of travel of lateral vibrations in the tight and slack sides of said belt in the direction of, and in the direction opposite to, the linear movement of said belt between said pulleys.

3. In an apparatus for the determination of delivered power, the combination of a vibratory member attached to a load and under linear transportation and stress due to the application of force, a motor, a record sheet driven thereby, a time-recording member for producing a time record on said sheet, other recording means associated with said sheet, and elements associated with said vibratory member and with said recording means, said elements being affected by lateral vibrations of the vibratory member induced by external blows upon the vibratory member, whereby the speed of travel of lateral vibrations in the vibratory member in the direction of, and in the direction opposite to, the direction of its linear transportation will be recorded upon said record sheet.

4. In an apparatus for the determination of delivered power, the combination of a vibratory member attached to a load and under linear transportation and stress due to the application of force, a motor, a record sheet driven thereby, a time record on said sheet, recording means associated with said sheet, and elements associated with said vibratory member and with said recording means, said elements being affected by lateral vibrations of the vibratory member induced by external blows upon the vibratory member, whereby the speed of travel of lateral vibrations in the vibratory member in the direction of, and in the direction opposite to, the direction of its linear transportation will be recorded upon said record sheet.

5. In an apparatus of the class described, a terminal member comprising a movable body having a portion formed to rest upon and be supported by a linearly-traveling power-transmission member, said main body being movable at an angle to the direction of movement of the power transmitting member, a pair of electrical contact points carried by said main body and one movable relative to the other, a weight mounted upon said main body and movable relative thereto in the direction of movement of the main body, and a connection between said movable weight and the movable terminal, for the purpose set forth.

6. In an apparatus of the class described, a terminal member comprising a pair of contact points, a spring arm carrying one of said contact points and normally urging the same toward the companion contact point, a stronger spring arm engaging the first mentioned spring arm and normally urging the same in a direction opposite to its normal movement, said last mentioned spring arm having a portion formed to rest upon a linearly moving power transmission member.

7. In a recording apparatus, the combination with a movable record sheet, of an electromagnet, a vibratory armature associated therewith, means for maintaining vibration of said armature during impressment of current upon the circuit of said magnet, and a recording member associated with said armature and sheet.

8. In a recording apparatus, the combination with a record sheet, of a pen associated with said sheet to produce a fresh ink line thereon, and a vibratory finger arranged adjacent said sheet and line to sweep laterally across the fresh ink line and carry a portion of the ink therefrom laterally to an adjacent portion of the sheet.

9. In an apparatus for the determination of delivered power, the combination of a vibratory member attached to a load and under linear transportation and stress due to the application of force, and a recording member for recording the speed of travel of lateral vibrations in said vibratory member in the line of its linear transportation.

10. In an apparatus for the determination of delivered power, the combination with a driving pulley, a driven pulley, and an endless transmission belt connecting the same, of means for determining the speed of travel of lateral vibrations in the tight and slack sides of said belt in the line of its linear transportation.

11. In an apparatus for the determination of delivered power, the combination of a vibratory member attached to a load and under linear transportation and stress due to the application of force, a motor, a record sheet driven thereby, a time-recording member for producing a time record on said sheet, other recording means associated with said sheet, and elements associated with said vibratory member and with said recording means, said elements being affected by lateral vibrations of the vibratory member induced by external blows upon the vibratory member, whereby the speed of travel of lateral vibrations in the vibratory member in line of its linear transportation may be determined.

12. In an apparatus for the determination of delivered power, the combination of a vibratory member attached to a load and under linear transportation and stress due to the application of force, a motor, a record sheet driven thereby, a time record on said sheet, recording means associated with said sheet, and elements associated with said vibratory member and with said recording means, said elements being affected by lateral vibrations of the vibratory member induced by external blows upon the vibratory member, whereby the speed of travel of lateral vibrations in the vibratory member in the line of its linear transportation may be determined.

13. In a recording apparatus, the combination of a carrier for a record member, a motor for said member, means for normally operating to maintain said carrier stationary, a recording member, a carrier for the recording member by which the recording member may be moved to and from recording association with a record member on the record-member-carrier, and means, operating, upon movement of the recording member to recording position, to start the record-member-carrier in motion.

14. In a recording apparatus, the combination of a motor, a record-carrier connected to said motor, a second carrier movably arranged adjacent said record-carrier, a recording member carried by said second carrier and movable with it to and from recording conjunction with the record-carrier, a catch normally restraining movement of the record-carrier and arranged to be withdrawn upon movement of the recording member to recording position, and means for limiting the movement of the record-carrier.

15. In a recording apparatus, the combination of a motor, a record-carrier connected to said motor, a second carrier movably arranged adjacent said record-carrier, a recording member carried by said second carrier and movable with it to and from recording conjunction with the record-carrier, and means for limiting the movement of the record-carrier.

16. In a recording apparatus, the combination of a motor, a record-carrier connected to said motor, a second carrier movably arranged adjacent said record-carrier, a recording member carried by said second carrier and movable with it to and from recording conjunction with the record-carrier, and a catch normally restraining movement of the record-carrier and arranged to be withdrawn upon movement of the recording member to recording position.

In witness whereof I have hereunto set my hand at Lawrence, Kansas, this 29th day of January, A. D. one thousand nine hundred and thirteen.

LAWRENCE N. MORSCHER.

Witnesses:
PAUL A. DINSMOOR,
HORACE L. MOORE.

Copies of this patent may be obtained for five cents each, by addressing the "Commissioner of Patents, Washington, D. C."